United States Patent
Liu et al.

(10) Patent No.: US 9,665,081 B2
(45) Date of Patent: May 30, 2017

(54) INTELLIGENT POWER UTILIZATION SYSTEM AND METHOD FOR PARKS

(75) Inventors: Jianming Liu, Beijing (CN); Jiye Wang, Beijing (CN); Ning Li, Beijing (CN); Fengyu Wang, Beijing (CN); Liang Wu, Beijing (CN); Aimei Yan, Beijing (CN)

(73) Assignees: State Grid Information & Telecommunications Branch Ltd., Beijing (CN); Guo Dian Tong Network Technology Company Limited, Beijing (CN); State Grid Corporation of China (SGCC), Beijing (CN)

( * ) Notice: Subject to any disclaimer, the term of this patent is extended or adjusted under 35 U.S.C. 154(b) by 534 days.

(21) Appl. No.: 14/369,005

(22) PCT Filed: Jan. 29, 2012

(86) PCT No.: PCT/CN2012/070729
§ 371 (c)(1),
(2), (4) Date: Jun. 26, 2014

(87) PCT Pub. No.: WO2013/097318
PCT Pub. Date: Jul. 4, 2013

(65) Prior Publication Data
US 2014/0358315 A1 Dec. 4, 2014

(30) Foreign Application Priority Data
Dec. 31, 2011 (CN) .......................... 2011 1 0460640

(51) Int. Cl.
*H02J 13/00* (2006.01)
*G05B 15/02* (2006.01)
(Continued)

(52) U.S. Cl.
CPC ............. *G05B 15/02* (2013.01); *G06Q 10/00* (2013.01); *G06Q 50/06* (2013.01); *H02J 3/14* (2013.01);
(Continued)

(58) Field of Classification Search
None
See application file for complete search history.

(56) References Cited

U.S. PATENT DOCUMENTS

2002/0066045 A1* 5/2002 Layton ...................... G06F 1/26
713/300
2010/0250440 A1* 9/2010 Wang ..................... G06Q 10/06
705/63

(Continued)

FOREIGN PATENT DOCUMENTS

CN 101916093 A 12/2010
CN 101951027 A 1/2011
(Continued)

OTHER PUBLICATIONS

State Intellectual Property Office of People's Republic of China Notification of First Office Action; Notification date, Feb. 28, 2013; Application No. 201110460640.7. Translation provided by Unitalen Attorneys at Law.
(Continued)

*Primary Examiner* — Isaac T Tecklu
(74) *Attorney, Agent, or Firm* — Harness, Dickey & Pierce, P.L.C.

(57) ABSTRACT

A system for intelligent electric power utilization of park and a method thereof are provided. The system includes an acquisition system, a data processing system, an application system and a service system through which the acquisition system, the data processing system and the application system are connected to external system. The application
(Continued)

system includes an intelligent interaction application subsystem, an electric power utilization monitoring application subsystem, an energy efficiency analysis application subsystem, an orderly electric power utilization application subsystem, a system security application subsystem and a man-machine interaction interface. Enterprise users are leaded to actively carry out requirement response. Energy conservation and emission reduction and peak shaving and valley filling are effectively realized in intelligent park. Capability of intelligent electric power utilization of the park is improved. Accordingly, load balancing capability of region is improved and safe and stable operation of the power grid is ensured.

7 Claims, 3 Drawing Sheets

(51) Int. Cl.
    *G06Q 50/06*     (2012.01)
    *G06Q 10/00*     (2012.01)
    *H02J 3/14*     (2006.01)

(52) U.S. Cl.
    CPC ........... *H02J 13/00* (2013.01); *Y02B 70/3225* (2013.01); *Y02E 40/76* (2013.01); *Y02P 80/10* (2015.11); *Y02P 80/11* (2015.11); *Y04S 10/545* (2013.01); *Y04S 20/222* (2013.01)

(56) References Cited

U.S. PATENT DOCUMENTS

| | | | | |
|---|---|---|---|---|
| 2010/0274656 | A1* | 10/2010 | Genschel | G06Q 30/00 705/14.27 |
| 2010/0324962 | A1* | 12/2010 | Nesler | G01R 21/133 705/7.36 |
| 2011/0125422 | A1* | 5/2011 | Goncalves Jota | G01D 4/004 702/45 |
| 2012/0004784 | A1* | 1/2012 | Oh | G01D 4/00 700/291 |
| 2012/0004872 | A1* | 1/2012 | Oh | G01D 3/10 702/62 |
| 2012/0065789 | A1* | 3/2012 | Scelzi | G01K 17/20 700/291 |
| 2012/0150679 | A1* | 6/2012 | Lazaris | G06Q 30/0605 705/26.2 |
| 2012/0161517 | A1* | 6/2012 | Kim | H02J 3/14 307/31 |
| 2012/0232701 | A1* | 9/2012 | Carty | G05B 15/02 700/277 |
| 2012/0271576 | A1* | 10/2012 | Kamel | H02J 13/0006 702/62 |
| 2012/0310559 | A1* | 12/2012 | Taft | H02J 13/0013 702/62 |
| 2013/0131880 | A1* | 5/2013 | Lee | G06Q 20/145 700/291 |
| 2014/0129746 | A1* | 5/2014 | Zhou | G06F 5/14 710/56 |
| 2014/0312850 | A1* | 10/2014 | Song | H02J 7/0014 320/134 |
| 2014/0354234 | A1* | 12/2014 | Sudan | H02J 7/34 320/127 |
| 2014/0371933 | A1* | 12/2014 | Iwamura | G06F 1/3209 700/291 |
| 2015/0094968 | A1* | 4/2015 | Jia | G06Q 40/04 702/60 |
| 2016/0378127 | A1* | 12/2016 | Scelzi | G06Q 10/00 700/295 |

FOREIGN PATENT DOCUMENTS

| | | |
|---|---|---|
| CN | 102082787 A | 6/2011 |
| CN | 102164175 A | 8/2011 |
| CN | 102254024 A | 11/2011 |
| CN | 102298378 A | 12/2011 |
| JP | 2003256761 A | 9/2003 |
| JP | 3923860 B2 | 6/2007 |
| KR | 100792160 B1 | 1/2008 |

OTHER PUBLICATIONS

International Search Report (English and Chinese) for PCT/CN2012/070729, ISA/CN, mailed Aug. 30, 2012.
Written Opinion of the ISA (Chinese) for PCT/CN2012/070729, ISA/CN, mailed Aug. 30, 2012.

\* cited by examiner

INTELLIGENT POWER UTILIZATION SYSTEM AND METHOD FOR PARKS

This application is the national phase of International Application No. PCT/CN2012/070729, titled "SYSTEM FOR INTELLIGENT ELECTRIC POWER UTILIZATION OF PARK AND METHOD THEREOF", filed on Jan. 29, 2012, which claims priority to Chinese patent application No. 201110460640.7, titled "SYSTEM FOR INTELLIGENT ELECTRIC POWER UTILIZATION OF PARK AND METHOD THEREOF" and filed with the State Intellectual Property Office of People's Republic of China on Dec. 31, 2011, which are incorporated herein by reference in their entirety.

FIELD

This application relates to the field of electric power system, and in particular, to a system for an intelligent electric power utilization of a park and a method thereof.

BACKGROUND

With the development of the modern electric power grid and the applications of various advanced technologies, intelligent electric power grid has become an inevitable development trend of the electric power grid. The intelligent electric power grid is a new modern electric power grid generated by highly integrating electric power grid infrastructures and the combination of advanced sensing measurement technology, information communication technology, analysis decision technology, automatic control technology and energy and electric power technology.

Intelligentization of an electric power utilization tache is a main sign of the intelligent electric power grid, and an important means for realizing real-time information acquisition management of the electric power grid and real-time interaction and response between the electric power grid and users, enhancing the integrated service capability of the electric power gird, satisfying the interactive marketing requirements and improving service qualities.

The park is a main carrier for implementing the above functions. Taking a certain industrial park with lots of high energy-consuming enterprises as an example, the intelligent electric power grid is intended to achieve, by using advanced electric power technologies, the energy conservation and efficiency enhancement and the peak shaving and valley filling in the park, improve a capability of the intelligent electric power utilization of the park, improve a load balancing capability of a region and ensure a safe and stable operation of the electric power grid.

Currently, there exists, in the market, only a product dedicated for a certain tache in an intelligent electric power utilization tache of the park, rather than a complete system for an intelligent electric power utilization of the park.

SUMMARY

Currently, there exists, in the market, only a product dedicated for a certain tache in an intelligent electric power utilization tache of a park, rather than a complete system for an intelligent electric power utilization of the park. In view of this, a system for an intelligent electric power utilization of a park is provided in the application to fill the vacancy.

Accordingly, a technical solution provided in the application is described as follows.

A system for an intelligent electric power utilization of a park includes an acquisition system, a data processing system, an application system and a service system.

The acquisition system, the data processing system and the application system are all connected to an external system through the service system.

The application system includes an intelligent interaction application subsystem, an electric power utilization monitoring application subsystem, an energy efficiency analysis application subsystem, an orderly electric power utilization application subsystem, a system security application subsystem and a man-machine interaction interface.

The acquisition system acquires electric power data on an enterprise side.

The data processing system processes the power data, and stores the processed power data.

In case of receiving a business processing request for an intelligent interaction, an electric power utilization monitoring, an energy efficiency analysis, an orderly electric power utilization or a system security, the man-machine interaction interface calls an application subsystem corresponding to the business processing request. The application subsystem analyzes the electric power data to obtain a corresponding application strategy and the application strategy is displayed on a terminal.

Preferably, in the system for the intelligent electric power utilization of the park, the acquisition system includes intelligent electric meters, a communication manager and a front-end server.

Preferably, in the system for the intelligent electric power utilization of the park, the data processing system includes a cloud computing platform and a Real Application Cluster (RAC).

Preferably, in the system for the intelligent electric power utilization of the park, the data processing system processes the electric power data, and stores the processed electric power data by performing a cloud storage and a relational database storage on the electric power data.

Preferably, in the system for the intelligent electric power utilization of the park, the acquisition system, the data processing system and the application system are all connected to the external system through the service system by connecting the acquisition system, the data processing system and the application system with the external system through a data bus and a service bus provided by the service system.

Preferably, in the system for the intelligent electric power utilization of the park, the terminal includes an intelligent interaction terminal, an IPAD terminal and a PC.

A method for an intelligent electric power utilization of a park is based on a system for the intelligent electric power utilization of the park. The system includes an acquisition system, a data processing system, an application system and a service system. The application system includes an intelligent interaction application subsystem, an electric power utilization monitoring application subsystem, an energy efficiency analysis application subsystem, an orderly electric power utilization application subsystem, a system security application subsystem and a man-machine interaction interface. The service system connects the acquisition system, the data processing system and the application system to an external system through a bus.

The method includes:
acquiring electric power data on an enterprise side by the acquisition system;

processing the electric power data and storing the processed electric power data, by the data processing system; and calling, by the man-machine interaction interface, an application subsystem corresponding to a business processing request for an intelligent interaction, an electric power utilization monitoring, an energy efficiency analysis, an orderly electric power utilization or a system security, in the case that the man-machine interaction interface receives the business processing request, where the application subsystem analyzes the electric power data to obtain a corresponding application strategy and the application strategy is displayed on a terminal.

It can be seen from the above technical solution that, a comprehensive solution is provided in the application based on construction requirements for the park. In the solution, various taches of the intelligent electric power utilization, such as electric power utilization acquisition, real-time monitoring, the intelligent interaction, the energy efficiency analysis and the orderly electric power utilization, are taken into consideration. With the system, enterprise users may be leaded to actively carry out a requirement response. The energy conservation and emission reduction and the peak shaving and valley filling are effectively realized in an intelligent park. A capability of the intelligent electric power utilization of the park is improved. Accordingly, a load balancing capability of a region is improved and a safe and stable operation of the electric power grid is ensured.

DETAILED DESCRIPTION OF THE EMBODIMENTS

A technical solution according to embodiments of the application is described clearly and completely hereinafter in conjunction with drawings used in the embodiments of the application. Obviously, the described embodiments are only part of, rather than all of the embodiments of the application. All other embodiments obtained by those skilled in the art based on the embodiments of the application without any creative works fall in the scope of protection of the present application.

Currently, there exists, in the market, only a product dedicated for a certain tache in an intelligent electric power utilization tache of a park, rather than a complete system for an intelligent electric power utilization of the park. Hence, a system for an intelligent electric power utilization of a park is disclosed according to an embodiment of the application to fill the vacancy.

Figure 1:
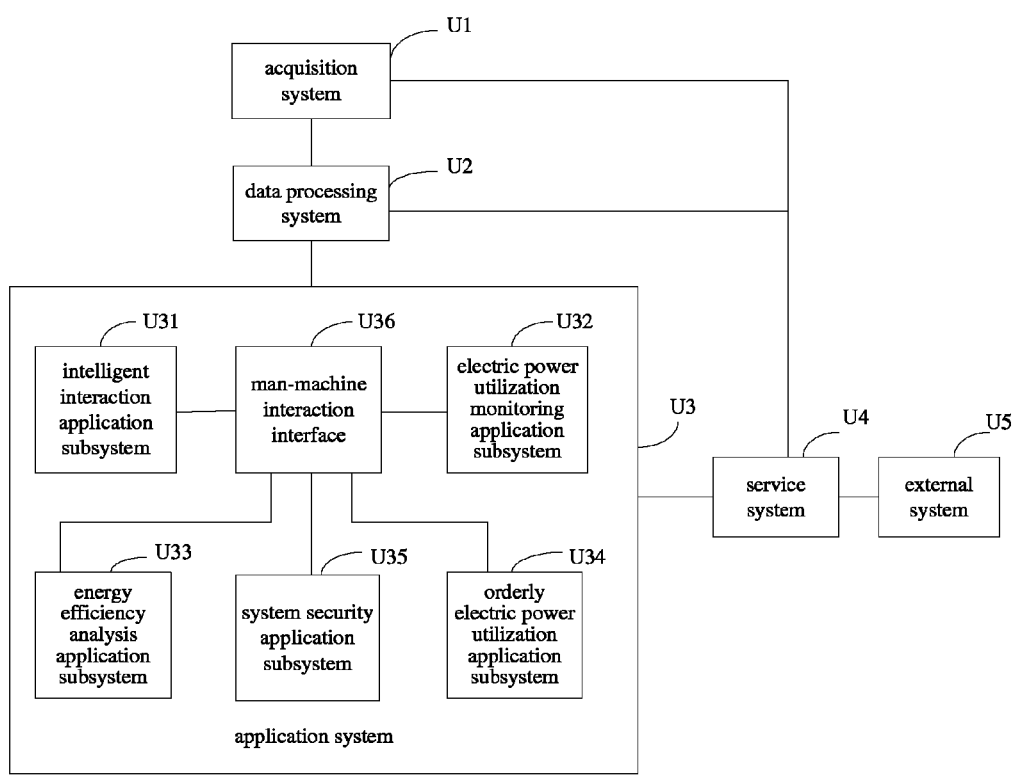
FIG. 1 is a schematic structural diagram of a system for an intelligent electric power utilization system of a park according to an embodiment of the application.

FIG. 1 illustrates one structure of the system.

The system includes an acquisition system U1, a data processing system U2, an application system U3 and a service system U4.

The application system U3 includes an intelligent interaction application subsystem U31, an electric power utilization monitoring application subsystem U32, an energy efficiency analysis application subsystem U33, an orderly electric power utilization application subsystem U34, a system security application subsystem U35 and a man-machine interaction interface U36. The acquisition system U1, the data processing system U2 and the application system U3 are all connected to an external system through the service system U4.

The acquisition system U1 acquires electric power data of an enterprise side. The data processing system U2 processes the electric power data and stores the processed electric power data. In case of receiving a business processing request for an intelligent interaction, an electric power utilization monitoring, an energy efficiency analysis, an orderly electric power utilization or a system security, the application interface U3 calls an application subsystem corresponding to the business processing request. The application subsystem analyzes the electric power data to obtain a corresponding application strategy and the application strategy is displayed on a terminal.

The terminal may include an intelligent interaction terminal, an IPAD terminal and a PC.

A comprehensive solution is provided in the application based on construction requirements for enterprise users and an electric power company in the park. In the solution, various taches of the intelligent electric power utilization, such as electric power utilization acquisition, real-time monitoring, the intelligent interaction, the energy efficiency analysis and the orderly electric power utilization, are taken into consideration. With the system, the enterprise users may be leaded to actively carry out a requirement response. The energy conservation and emission reduction and the peak shaving and valley filling are effectively realized in an intelligent park. A capability of the intelligent electric power utilization of the park is improved. Accordingly, a load balancing capability of a region is improved and a safe and stable operation of the electric power grid is ensured.

Figure 2:
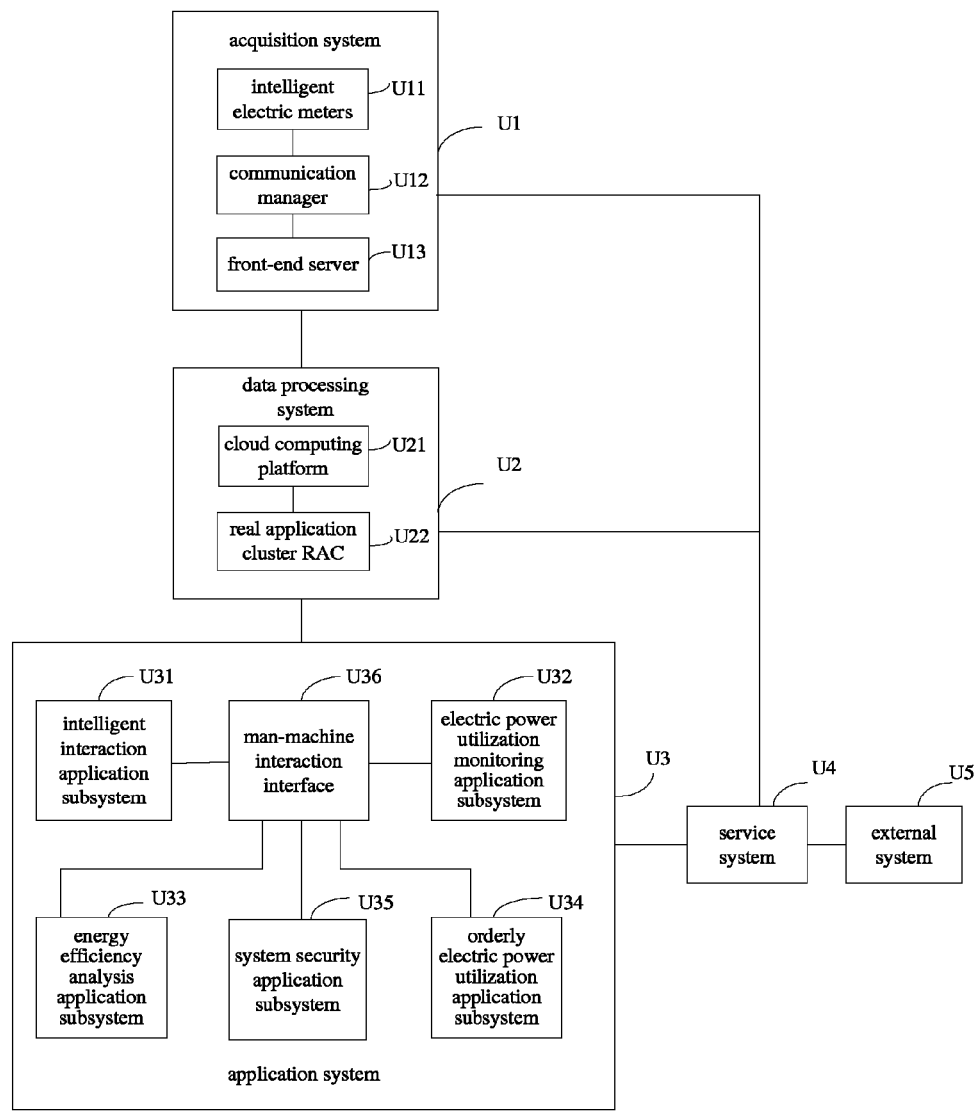
FIG. 2 is another schematic structural diagram of a system for an intelligent electric power utilization of a park according to an embodiment of the application.
Figure 3:
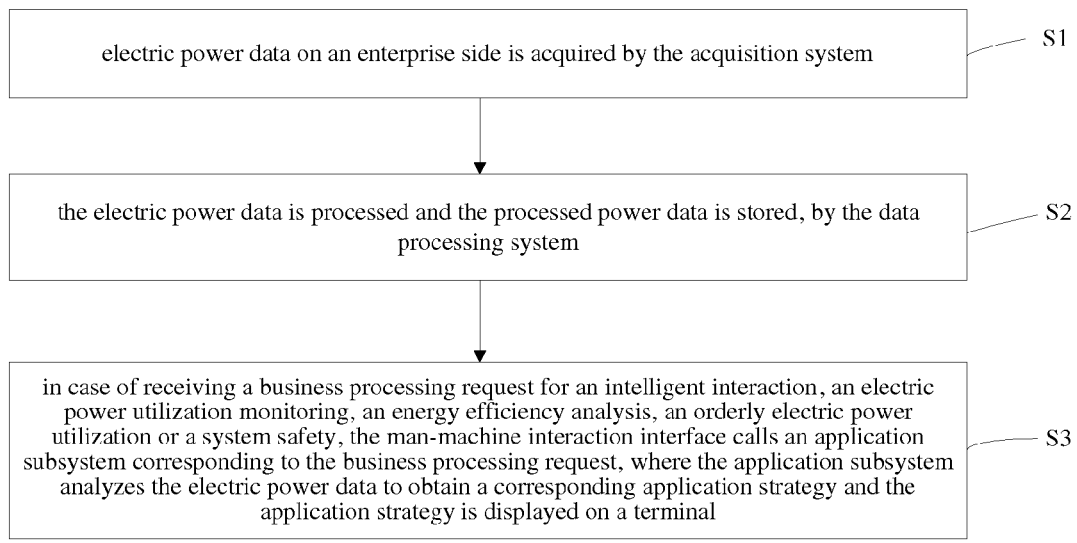
FIG. 3 is a schematic flowchart of a method for an intelligent electric power utilization of a park according to an embodiment of the application.

FIG. 2 illustrates another structure of the system.

The acquisition system U1 may include intelligent electric meters U11, a communication manager U12 and a front-end server U13. The data processing system U2 may include a cloud computing platform U21 and a Real Application Cluster (RAC) U22. The application system includes the intelligent interaction application subsystem U31, the electric power utilization monitoring application subsystem U32, the energy efficiency analysis application subsystem U33, the orderly electric power utilization application subsystem U34, the system security application subsystem U35 and the man-machine interaction interface U36.

The acquisition system U1 acquires, with a set acquisition frequency, the electric power data such as a voltage, a load, a frequency, a power factor and a harmonic wave. Since electric power utilizations of the enterprise users need to be deep analyzed to provide guidance for the intelligent electric power utilization, the intelligent electric meters U11 are generally installed on the enterprise side. The intelligent electric meters U11 may be installed on various loops after a low-voltage output line based on electric power utilization properties of the enterprises. The intelligent electric meters U11 are required to support a second-level acquisition frequency. The communication manager U12 polls the intelligent electric meters with a designated frequency, and stores the electric power data of the intelligent electric meters U11 in registers. The front-end server U13 polls storage regions of the registers designated by the communication manager, to acquire data.

A Global Positioning System (GPS) clock is employed in the system for the intelligent electric power utilization system of the park, to ensure that the intelligent electric meters U11, the communication manager U12 and the front-end server U13 acquire data synchronously.

Furthermore, the communication manager may shut down during a high-frequency (second-level) acquisition due to a data loss and instable data. Therefore, the communication manager U12 is programmed by the front-end server U13. In the case that the communication manager U12 is initiated, a thread for monitoring a state of the communication manager U12 is initiated simultaneously. The state of the communication manager U12 is monitored per five minutes. If the communication manager shuts down, the communication manager automatically reverts to a running status to ensure a stable data acquisition. The acquired electric power data may be discontinuous due to a complicated circumstance of an acquisition site. For example, the acquired power data such as instantaneous values of a device may be discontinuous to some extent in case of an abnormal communication. To solve the above-mentioned disadvantage, the registers perform merely updating operations when the communication manager U12 polls the intelligent electric meters U11. In the case that data of the intelligent electric meters U11 is not acquired for ten continuous times of polling, the registers are emptied to ensure a continuity of the electric power data (if the data is continuously lost for ten times, it is determined that a hardware problem occurs). In addition, the acquired power data may be unreasonable (for example, an abnormal current value may be acquired at an initiation of an electric power device). Therefore, each time the front-end server U13 polls the communication manager U12, an acquired latest schedule is compared with a previous data item, and smoothing an abnormal value, completing a null value and so on are performed based on an acquisition item. For example, a normal value of a line voltage is 380V, and an allowable voltage deviation for the electric power utilization of the enterprise is plus or minus 8%. In the case that a certain instantaneous value exceeds more than 20%, it is determined as abnormal data by the system and smoothed by being replaced with a value of a previous acquisition point.

The data processing system U2 may include the cloud computing platform U21 and the Real Application Cluster (RAC) U22.

The cloud platform U21 and the RAC U22 are incorporated in the application, to support a second-level data monitoring and a data application analysis in condition of abundant electric power data. In the case that the front-end server U13 reports the data, the acquired electric power data is written into the cloud computing platform U21 and the RAC U22 at integral points set in the GPS clock. The cloud computing platform U21 aggregates real-time electric power data, performs an Extraction-Transformation-Loading (ETL) process on the real-time electric power data, and writes the processed real-time electric power data into the RAC U22. The cloud computing platform U21 is for applications of a cloud storage of the abundant electric power data, an analysis and a mining algorithm. The cloud computing platform employs a Linux operating system. With a powerful computing capability of the cloud computing platform, the acquired real-time electric power data is aggregated with a designated frequency though a timed jobs command. The acquired real-time electric power data is aggregated into minute-level, hour-level, day-level, month-level and year-level data and then written into the RAC U22. And the cloud computing platform provides the application system with services of the analysis and the mining algorithm through a data mining parallel prediction algorithm, an adaptive scheduling algorithm, a classification algorithm, an aggregating algorithm and so on. The RAC U22 is generally for supporting applications of monitoring, interaction and the energy efficiency analysis of the system for the intelligent electric power utilization of the park. The RAC U22 may provide a powerful database processing, and performs a cluster processing on a database to provide a basis for implementing second-level applications. With an incorporation of the RAC U22 and the cloud computing platform, a second-level acquisition pressure of the applications is balanced, a pressure of accessing the system for the intelligent electric power utilization of the park by the applications is balanced, and a data support is provided to the application system.

The application system U3 includes the intelligent interaction application subsystem U31, the electric power utilization monitoring application subsystem U32, the energy efficiency analysis application subsystem U33, the orderly electric power utilization application subsystem U34, the system security application subsystem U35 and the man-machine interaction interface U36. In case of receiving a business processing request for an intelligent interaction, an electric power utilization monitoring, an energy efficiency analysis, an orderly electric power utilization or a system security, the man-machine interaction interface U36 calls an application subsystem corresponding to the business processing request. The application subsystem analyzes the electric power data to obtain a corresponding application strategy and the application strategy is displayed on a terminal. The application system generally employs a three-layer architecture of Model View Controller (MVC) model-view-controller to implement an overall architecture of the system for the intelligent electric power utilization of the park.

The service system supplies, via a data bus and a service bus, the data acquired and generated in the system for the intelligent electric power utilization of the park to internal parts of the system for the intelligent electric power utilization of the park and an external system. The external system is a system external to the system for the intelligent electric power utilization system of the park.

A method for an intelligent electric power utilization of a park is further disclosed according to an embodiment of the application, which is based on an apparatus for the intelligent electric power utilization system of the park. The apparatus includes an acquisition system, a data processing system, an application system and a service system. The application system includes an intelligent interaction application subsystem, an electric power utilization monitoring application subsystem, an energy efficiency analysis application subsystem, an orderly electric power utilization application subsystem, a system security application subsystem and a man-machine interaction interface. The service system connects the acquisition system, the data processing system and the application system with an external system through a bus. The method includes the following steps S1-S3.

In the step S1, electric power data on an enterprise side is acquired by the acquisition system.

In the step S2, the electric power data is processed and the processed power data is stored, by the data processing system.

In the step S3, in case of receiving a business processing request for an intelligent interaction, an electric power utilization monitoring, an energy efficiency analysis, an orderly electric power utilization or a system safety, the man-machine interaction interface calls an application subsystem corresponding to the business processing request, where the application subsystem analyzes the electric power data to obtain a corresponding application strategy and the application strategy is displayed on a terminal.

The embodiments in the specification are described progressively. Differences form other embodiments are emphasized in the explanation of each embodiment, and same or similar parts among the embodiments can be referred to each another. The method disclosed according to the embodiment is briefly described since it corresponds to the system disclosed according to the embodiment. Relevant portions may be referred to the description of the system.

It can be understood by those skilled in the art that, all or part of the steps of the method according to the embodiment may be achieved by relevant hardware instructed by a computer program. The program may be stored in a computer readable storage medium. All the steps of the method according to the embodiment may be implemented by executing the program. The storage medium may include a magnetic disk, an optical disk, a Read-Only Memory (ROM) or a Random Access Memory (RAM).

The application may be implemented or used by those skilled in the art based on the above explanations of the disclosed embodiments. Numerous modifications to the embodiments are apparent to those skilled in the art. The general principle herein may be implemented in other embodiments without departing from the spirit or scope of the application. Therefore, the application may not be limited to the embodiments described herein, and should be in accordance with a widest scope consistent with the principle and novel features disclosed herein.

The invention claimed is:

1. A system for an intelligent electric power utilization of a park, comprising an acquisition system, a data processing system, an application system and a service system,
   wherein the acquisition system, the data processing system and the application system are all connected to an external system through the service system;
   the application system comprises an intelligent interaction application subsystem, an electric power utilization monitoring application subsystem, an energy efficiency analysis application subsystem, an orderly electric power utilization application subsystem, a system security application subsystem and a man-machine interaction interface;
   wherein the acquisition system is configured to acquire electric power data on an enterprise side;
   the data processing system is configured to process the electric power data and store the processed electric power data; and
   the man-machine interaction interface is configured to, in the case that the man-machine interaction interface receives a business processing request for an intelligent interaction, an electric power utilization monitoring, an energy efficiency analysis, an orderly electric power utilization or a system safety, call an application subsystem corresponding to the business processing request, wherein the application subsystem analyzes the electric power data to obtain a corresponding application strategy and the application strategy is displayed on a terminal.

2. The system for the intelligent electric power utilization of the park according to claim 1, wherein the acquisition system comprises intelligent electric meters, a communication manager and a front-end server.

3. The system for the intelligent electric power utilization of the park according to claim 1, wherein the data processing system comprises a cloud computing platform and a Real Application Cluster (RAC).

4. The system for the intelligent electric power utilization of the park according to claim 1, wherein the data processing system is configured to process the electric power data, and store the processed electric power data by performing a cloud storage and a relational database storage on the electric power data.

5. The system for the intelligent electric power utilization of the park according to claim 1, wherein the acquisition system, the data processing system and the application system are all connected to the external system through the service system by connecting the acquisition system, the data processing system and the application system with the external system through a data bus and a service bus provided by the service system.

6. The system for the intelligent electric power utilization of the park according to claim 1, wherein the terminal comprises an intelligent interaction terminal, an IPAD terminal and a PC.

7. A method for an intelligent power utilization of a park, based on a system for the intelligent power utilization system of the park, wherein the system comprises an acquisition system, a data processing system, an application system and a service system; the application system comprises an intelligent interaction application subsystem, an electric power utilization monitoring application subsystem, an energy efficiency analysis application subsystem, an orderly electric power utilization application subsystem, a system security application subsystem and a man-machine interaction interface; the service system connects the acquisition system, the data processing system and the application system to an external system through a bus;
   wherein the method comprises:
   acquiring electric power data on an enterprise side by the acquisition system;
   processing the electric power data and storing the processed electric power data, by the data processing system; and
   calling, by the man-machine interaction interface, an application subsystem corresponding to a business processing request for an intelligent interaction, an electric power utilization monitoring, an energy efficiency analysis, an orderly electric power utilization or a system security, in the case that the man-machine interaction interface receives the business processing request, wherein the application subsystem analyzes the electric power data to obtain a corresponding application strategy and the application strategy is displayed on a terminal.

* * * * *